(12) United States Patent
Craig

(10) Patent No.: US 10,213,850 B2
(45) Date of Patent: Feb. 26, 2019

(54) CUTTING INSERT, A CUTTING INSERT HOLDER, A SYSTEM INCLUDING THE CUTTING INSERT AND CUTTING INSERT HOLDER, AND A METHOD OF MANUFACTURING THEREOF

(71) Applicant: Kennametal Inc., Latrobe, PA (US)

(72) Inventor: Karen Anne Craig, Greensburg, PA (US)

(73) Assignee: KENNAMETAL INC., Latrobe, PA (US)

(*) Notice: Subject to any disclaimer, the term of this patent is extended or adjusted under 35 U.S.C. 154(b) by 1291 days.

(21) Appl. No.: 13/870,256

(22) Filed: Apr. 25, 2013

(65) Prior Publication Data

US 2014/0321927 A1    Oct. 30, 2014

(51) Int. Cl.
| | |
|---|---|
| B23C 5/22 | (2006.01) |
| B23C 5/28 | (2006.01) |
| B27B 27/10 | (2006.01) |
| B23B 27/10 | (2006.01) |
| B23B 27/16 | (2006.01) |
| B23C 5/00 | (2006.01) |
| B23C 5/20 | (2006.01) |

(Continued)

(52) U.S. Cl.
CPC .......... *B23C 5/2239* (2013.01); *B23B 27/10* (2013.01); *B23B 27/145* (2013.01); *B23B 27/164* (2013.01); *B23B 27/1611* (2013.01); *B23C 5/006* (2013.01); *B23C 5/207* (2013.01); *B23C 5/28* (2013.01); *B29C 39/025* (2013.01); *B23B 2250/12* (2013.01); *B23C 2200/0416* (2013.01); *B23C 2200/086* (2013.01); *B23C 2200/165* (2013.01); *B23C 2200/168* (2013.01); *B23C 2200/203* (2013.01); *B23C 2210/161* (2013.01); *B23C 2250/12* (2013.01); *B29L 2031/72* (2013.01); *Y10T 407/14* (2015.01); *Y10T 407/1934* (2015.01); *Y10T 407/2288* (2015.01); *Y10T 407/28* (2015.01)

(58) Field of Classification Search
CPC ........ B23C 2200/203; B23C 2200/086; B23C 2200/165; B23C 5/006; B23C 5/207; B23C 5/2239; B23C 2210/161; B23B 27/145; B23B 27/1611; B23B 27/164; Y10T 407/1934; Y10T 407/2288; Y10T 407/28
USPC .................... 407/113, 101, 64, 65
See application file for complete search history.

(56) References Cited

U.S. PATENT DOCUMENTS

| 385,088 A | * | 6/1888 | Benzie | ............... 408/227 |
| 864,756 A | * | 8/1907 | Philips | ............... 408/211 |

(Continued)

FOREIGN PATENT DOCUMENTS

| CN | 201579425 | 9/2010 |
| JP | 2002066821 | 3/2002 |
| WO | 2012073099 A2 | 6/2012 |

OTHER PUBLICATIONS

Apr. 19, 2017 First Office Action.

(Continued)

*Primary Examiner* — Sara Addisu
(74) *Attorney, Agent, or Firm* — Matthew S. Bedsole

(57) ABSTRACT

A cutting insert for metalworking operations is retained within a cutting insert holder by a resilient tab on the holder that engages a recess on the stem of the insert. The cutting insert and the holder may be fabricated using rapid prototyping techniques such as 3D printing.

9 Claims, 10 Drawing Sheets

(51) Int. Cl.
  *B29C 39/02* (2006.01)
  *B23B 27/14* (2006.01)
  *B29L 31/00* (2006.01)

(56) References Cited

U.S. PATENT DOCUMENTS

| | | | | |
|---|---|---|---|---|
| 1,476,019 A * | 12/1923 | Lowry | | 407/54 |
| 1,781,863 A * | 11/1930 | Shoemaker | | 408/205 |
| 1,951,856 A * | 3/1934 | Balke | | 76/115 |
| 1,965,950 A * | 7/1934 | Walker | | 172/713 |
| 2,289,065 A * | 7/1942 | Oliver | | 408/199 |
| 2,289,344 A * | 7/1942 | Cedarleaf | | 407/103 |
| 2,682,414 A * | 6/1954 | Richardson | | 279/77 |
| 3,646,679 A * | 3/1972 | Naugle et al. | | 433/1 |
| 3,654,681 A * | 4/1972 | Stein | | 407/115 |
| 3,705,447 A * | 12/1972 | Kollar | | 407/120 |
| 3,754,309 A * | 8/1973 | Jones et al. | | 407/77 |
| 3,857,305 A * | 12/1974 | Lichtman | | 76/115 |
| 3,911,543 A * | 10/1975 | Sorice | | 407/77 |
| 4,373,518 A * | 2/1983 | Kaiser et al. | | 606/916 |
| 4,505,626 A * | 3/1985 | Benhase | | B23B 51/009 |
| | | | | 408/223 |
| 4,591,302 A * | 5/1986 | Lovendahl | | B23B 51/10 |
| | | | | 407/104 |
| 4,725,171 A * | 2/1988 | DeTorre | | 408/213 |
| 4,844,668 A * | 7/1989 | Pettersson | | 407/117 |
| D305,498 S * | 1/1990 | Lassiter | | D8/70 |
| 4,898,499 A * | 2/1990 | Tsujimura | | B23C 5/1045 |
| | | | | 407/113 |
| 4,946,319 A * | 8/1990 | Lyon et al. | | 407/115 |
| 5,059,068 A | 10/1991 | Scott | | |
| 5,066,170 A * | 11/1991 | Berryer | | 407/54 |
| 5,078,551 A * | 1/1992 | Oomen | | 407/119 |
| 5,098,232 A * | 3/1992 | Benson | | B23B 27/007 |
| | | | | 407/24 |
| 5,205,680 A * | 4/1993 | Lindstedt | | 407/116 |
| 5,342,151 A * | 8/1994 | Friedmann | | 407/116 |
| 5,362,183 A * | 11/1994 | Alario et al. | | 407/119 |
| 5,433,280 A | 7/1995 | Smith | | |
| 5,509,761 A | 4/1996 | Grossman | | |
| 5,634,933 A * | 6/1997 | McCombs et al. | | 606/180 |
| 5,957,006 A | 9/1999 | Smith | | |
| 6,030,156 A * | 2/2000 | Andronica | | 408/144 |
| 6,116,823 A | 9/2000 | Mihic | | |
| 6,200,514 B1 | 3/2001 | Meister | | |
| 6,315,505 B1 * | 11/2001 | Moore | | 408/199 |
| 6,394,466 B1 * | 5/2002 | Matsumoto et al. | | 279/103 |
| 6,454,030 B1 | 9/2002 | Findley et al. | | |
| 6,472,029 B1 | 10/2002 | Skszek | | |
| 6,607,533 B2 * | 8/2003 | Del Rio et al. | | 606/80 |
| 6,692,199 B2 * | 2/2004 | Andersson et al. | | 407/116 |
| 6,715,968 B1 * | 4/2004 | Tagtstrom et al. | | 407/116 |
| 6,808,340 B2 * | 10/2004 | Travez et al. | | 408/239 R |
| 6,929,426 B2 * | 8/2005 | Thiele et al. | | 407/33 |
| 7,112,020 B2 * | 9/2006 | Sheffler et al. | | 409/234 |
| 7,313,991 B2 * | 1/2008 | Penkert | | 82/1.11 |
| 7,614,831 B2 * | 11/2009 | Liu et al. | | 407/113 |
| 7,832,456 B2 | 11/2010 | Calnan et al. | | |
| 8,007,373 B2 | 8/2011 | Soracco | | |
| 8,052,765 B2 | 11/2011 | Cho et al. | | |
| 8,308,403 B2 * | 11/2012 | Hecht | | 408/239 R |
| 8,323,122 B2 | 12/2012 | Soracco | | |
| 8,329,092 B2 | 12/2012 | Fuwa | | |
| 8,333,814 B2 | 12/2012 | Brackin et al. | | |
| 8,529,163 B2 | 9/2013 | Saji | | |
| 8,534,963 B2 * | 9/2013 | Luik | | 407/102 |
| 8,746,703 B2 * | 6/2014 | Xu | | B25B 23/0035 |
| | | | | 279/76 |
| 9,330,406 B2 | 5/2016 | Soracco | | |
| 2003/0118412 A1 * | 6/2003 | Fukui et al. | | 407/119 |
| 2003/0210963 A1 * | 11/2003 | Kakai | | B23B 31/008 |
| | | | | 408/231 |
| 2004/0120778 A1 * | 6/2004 | Lach et al. | | 407/107 |
| 2004/0221696 A1 * | 11/2004 | Matsuhashi et al. | | 82/1.11 |
| 2004/0258491 A1 | 12/2004 | Penkert | | |
| 2005/0238451 A1 * | 10/2005 | Hartman | | 409/234 |
| 2006/0048615 A1 * | 3/2006 | Treige | | 82/158 |
| 2006/0144198 A1 * | 7/2006 | Okajima et al. | | 82/158 |
| 2007/0283786 A1 | 12/2007 | Kappmeyer | | |
| 2008/0080937 A1 * | 4/2008 | Hecht | | 407/42 |
| 2008/0253849 A1 * | 10/2008 | Yoshinaga et al. | | 407/119 |
| 2009/0035075 A1 * | 2/2009 | Hecht | | B23B 27/007 |
| | | | | 407/104 |
| 2010/0011911 A1 | 1/2010 | Aalto | | |
| 2010/0172703 A1 * | 7/2010 | Neubold | | 407/53 |
| 2012/0103701 A1 | 5/2012 | Cho et al. | | |
| 2012/0141215 A1 * | 6/2012 | Choi | | B23B 27/02 |
| | | | | 407/11 |
| 2013/0004680 A1 | 1/2013 | Godfrey | | |

OTHER PUBLICATIONS

May 17, 2017 First office action.
Jul. 7, 2017 Office action (3 months).
Nov. 13, 2017 Second Office action.
Jan. 12, 2018 Second Office Action.
Feb. 13, 2018 First Office Action.
May 24, 2018 Foreign OA.
Jul. 27, 2018 Non-Final OA.
Jul. 20, 2018 Foreign OA.
Nov. 3, 2016 Final Office Action.
May 29, 2018 Foreign OA.

* cited by examiner

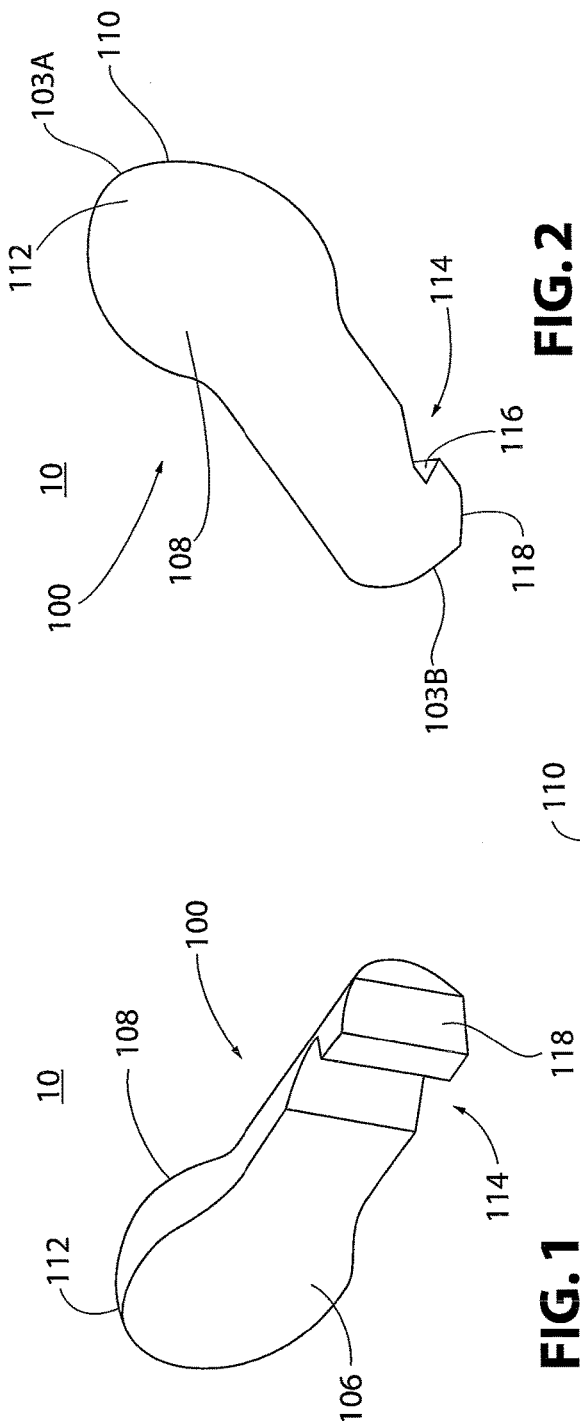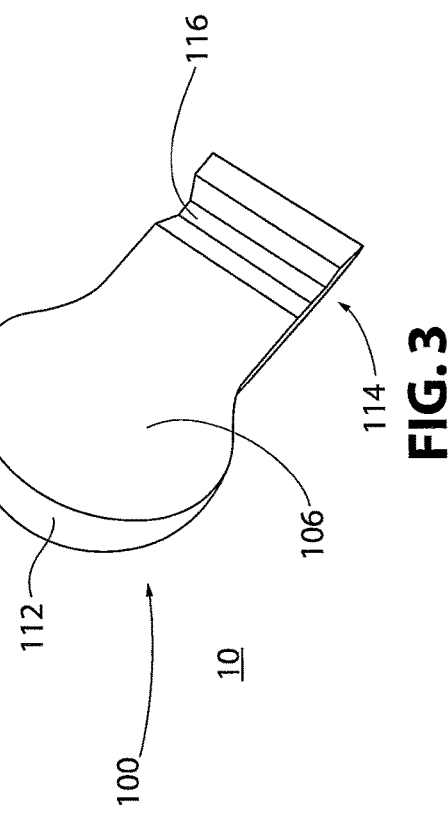

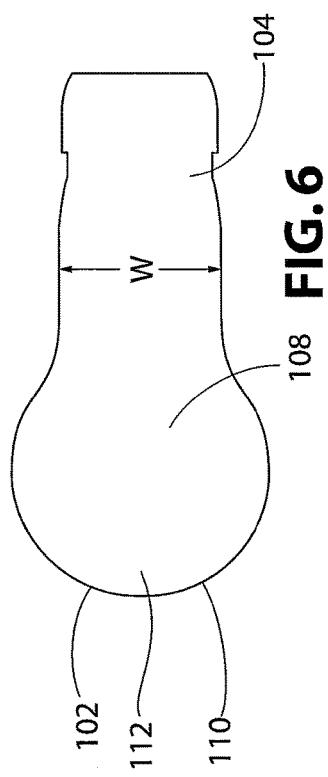
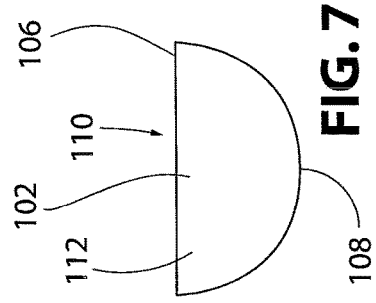
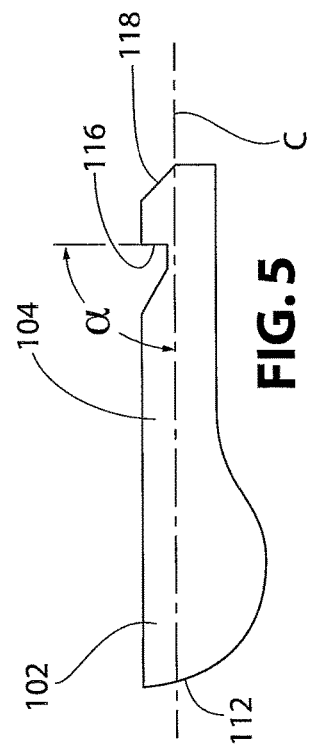
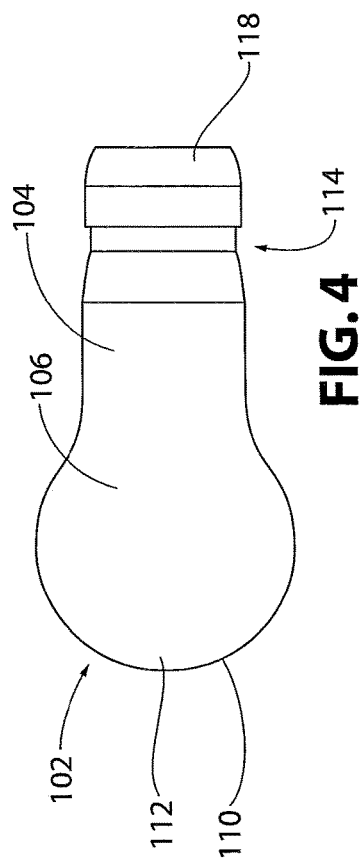
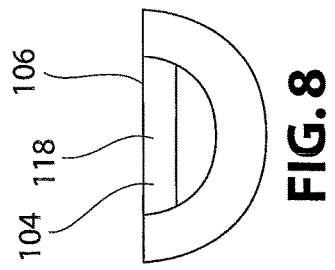

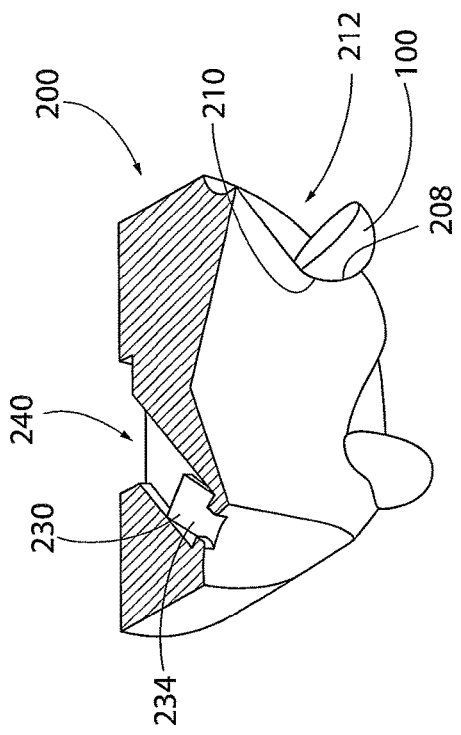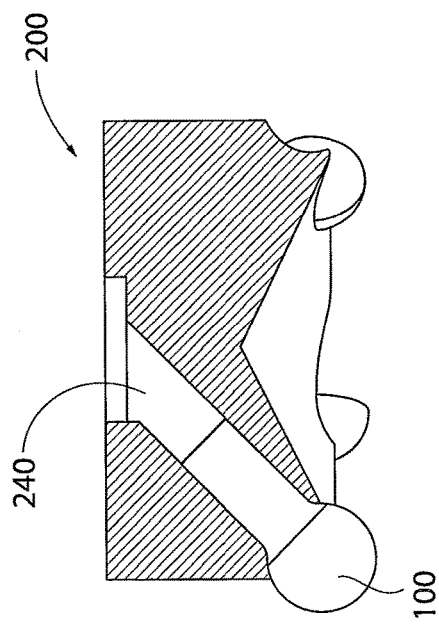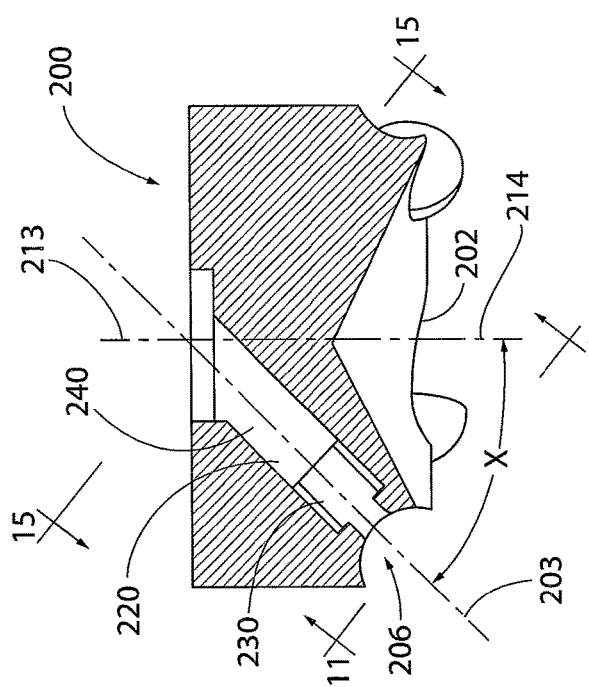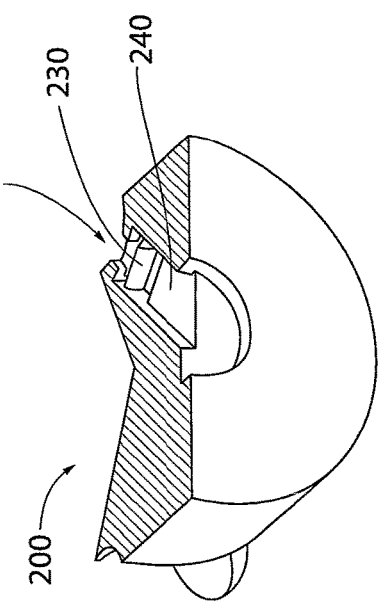

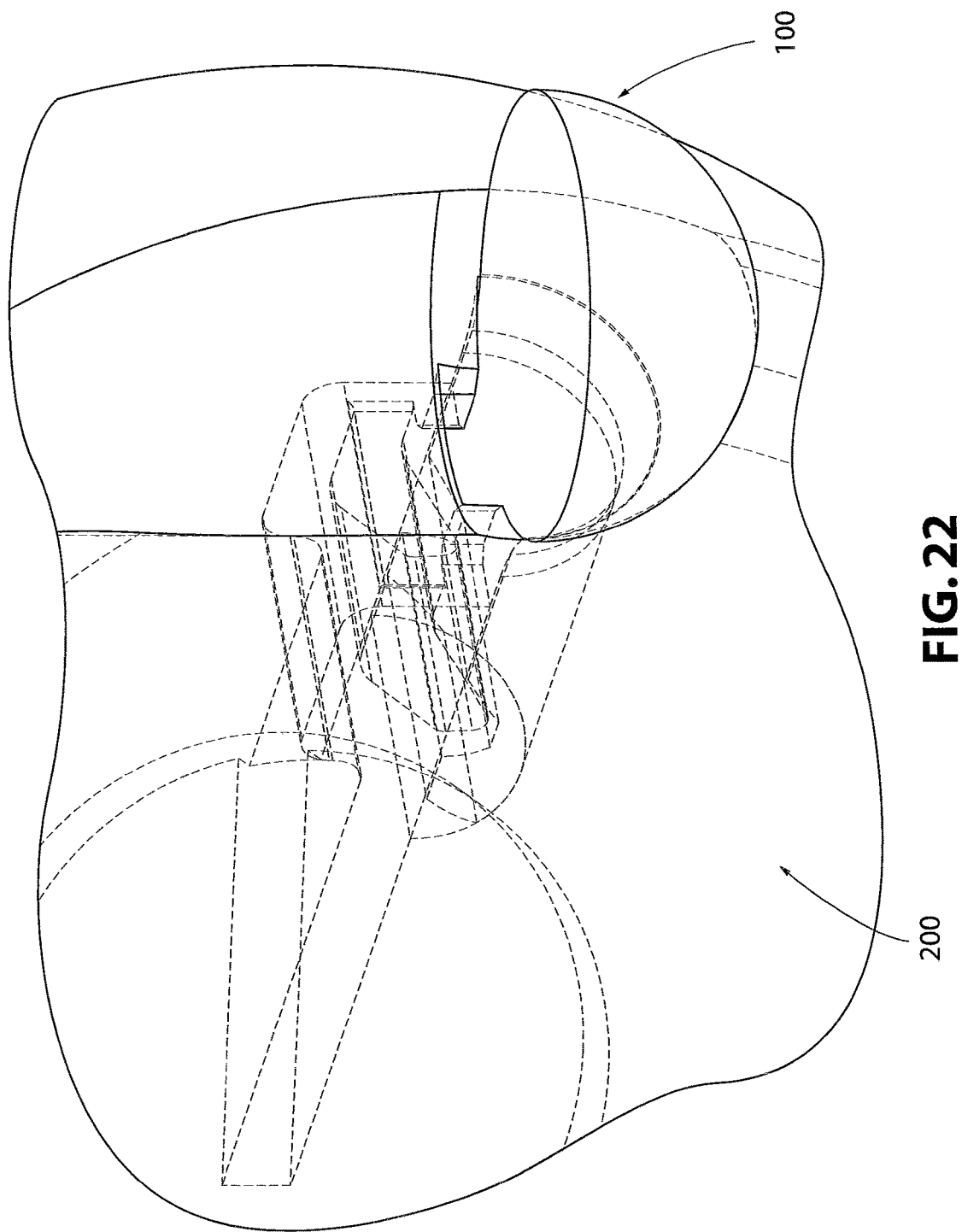

CUTTING INSERT, A CUTTING INSERT HOLDER, A SYSTEM INCLUDING THE CUTTING INSERT AND CUTTING INSERT HOLDER, AND A METHOD OF MANUFACTURING THEREOF

BACKGROUND OF THE INVENTION

Field of the Invention

The invention is directed to a cutting insert and cutting insert holder used for metalworking operations, wherein the cutting insert is resiliently retained within a cavity of the cutting insert holder. The cutting insert and the cutting insert holder may be fabricated using rapid prototyping, such as 3D printing.

Description of Related Art

Currently, cutting inserts are retained within holders for metalworking operations using clamps over the cutting inserts or screws extending through the inserts. Clamps require a portion of the cutting insert to be dedicated to a clamping surface while screws require a portion of the cutting insert to have a bore extending therethrough, which weakens the insert. Both of these retaining mechanisms limit miniaturization of the inset/holder arrangement.

A design is needed to eliminate external clamps and screws for retaining cutting inserts within holders.

SUMMARY OF THE INVENTION

In one embodiment, a cutting insert includes a body having a head at an end of the body and a stem at an opposite end of the body. The body also includes a cutting edge at the head and a locking surface at the stem. The locking surface is made up of a locking recess extending into the stem.

In another embodiment, a cutting insert holder has a body adapted to receive at least one cutting insert. The body has a cavity formed within the body for receiving a cutting insert. A resilient locking tab is disposed within the cavity and partially obstructing the cavity such that the resilient locking tab is displaced from an initial position to allow insertion of the cutting insert into the cavity and returns toward the initial position to lockingly engage with a locking surface of the cutting insert.

In yet another embodiment, a system includes at least one cutting insert and a cutting insert holder adapted to receive the at least one cutting insert. The cutting insert comprises a body having a head at an end of the body and a stem at an opposite end of the body and a cutting edge at the head. The cutting insert also has a locking surface at the stem, wherein the locking surface is made up of a locking recess extending into the stem. The cutting insert holder is comprised of a body and a cavity formed into the body for receiving the stem of the cutting insert therein along with a resilient locking tab disposed within the cavity and partially obstructing the cavity such that the resilient locking tab is displaced from an initial position to allow insertion of the stem of the cutting insert into the cavity and returns toward the original position to lockingly engage with the locking surface of the cutting insert.

In yet another embodiment, a method of manufacturing a cutting insert comprises forming, through a sequential layering process, a cutting insert having a body with a head at an end of the body and a stem at an opposite end of the body. The cutting insert has a cutting edge at the head and a locking surface is made up of a locking recess extending into the stem.

Still another embodiment is directed to a method of manufacturing a cutting insert holder having a body adapted to receive at least one cutting insert. The method is comprised of forming, through a sequential layering process, a body having a cavity formed into the body for receiving a portion of a cutting insert therein with a resilient locking tab disposed within the cavity and partially obstructing the cavity. The resilient locking tab is displaced from an initial position to allow insertion of the cutting insert into the cavity and returns toward the original position to lockingly engage with a locking surface of the cutting insert.

BRIEF DESCRIPTION OF THE DRAWINGS

FIG. 1 illustrates a top perspective view of a cutting insert according to one embodiment of the present invention.

FIG. 2 illustrates a bottom perspective view of the cutting insert illustrated in FIG. 1.

FIG. 3 illustrates another perspective view of the cutting insert illustrated in FIG. 1, showing a view into a recess of the cutting insert.

FIG. 4 illustrates a top view of the cutting insert illustrated in FIG. 1.

FIG. 5 illustrates a side view of the cutting insert illustrated in FIG. 1.

FIG. 6 illustrates a bottom view of the cutting insert illustrated in FIG. 1.

FIG. 7 illustrates an end view of the cutting insert illustrated in FIG. 1.

FIG. 8 illustrates another end view of the cutting insert illustrated in FIG. 1.

FIG. 16 illustrates a sectional view of the cutting insert holder along lines "16-16" in FIG. 10.

FIG. 17 illustrates a perspective view of the sectional of the cutting insert holder shown in FIG. 16 from a first end of the cutting insert holder.

FIG. 18 illustrates another perspective view of the sectional of the cutting insert holder shown in FIG. 16 from an opposite end of the cutting insert holder.

FIG. 19 illustrates a sectional view of the cutting insert holder shown in FIG. 16, but with a cutting insert mounted therein.

FIG. 22 illustrates another zoomed-in three-dimensional see-through view of the cutting insert holder together with a cutting insert secured therein

DETAILED DESCRIPTION OF THE ILLUSTRATED EMBODIMENTS

Figure 9:
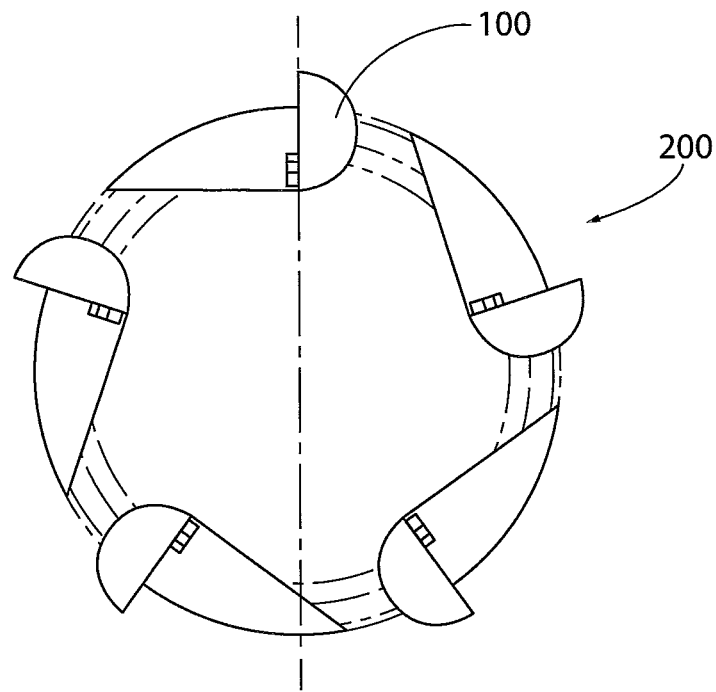
FIG. 9 illustrates an end view of a cutting insert holder with cutting inserts therein according to an embodiment of the present invention.
Figure 10:
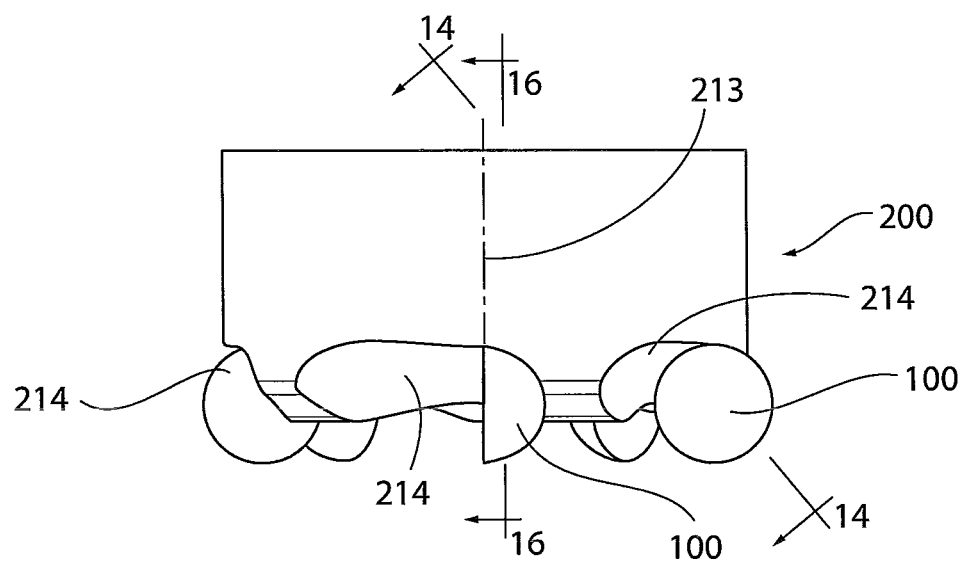
FIG. 10 is a side view of the cutting insert holder with cutting inserts therein in FIG. 9.

It is to be understood that the invention may assume various alternative variations, except where expressly specified to the contrary. It is also to be understood that the specific devices and processes, as illustrated in the attached drawings and described in the following specification, are simply exemplary embodiments of the invention. As used in the specification and the claims, the singular form of "a", "an", and "the" include plural referents unless the context clearly dictates otherwise.

FIGS. 1-8 illustrate a cutting insert 10 according to an embodiment of the present invention. The body 100 of the cutting insert 10 may have a length, width and depth, with the length being greater than the width to form a preferred overall shape of the cutting insert.

The cutting insert body 100 may include a head 102 disposed at one end 103A of the cutting insert body 100 and a stem 104 disposed at an opposing end 103B of the cutting insert body 100. A width of the head 102 may be greater than a width w of the stem 104.

The cutting insert body 100 may include a top face 106 and a bottom face 108. In the illustrated embodiment, the top face 106 is substantially flat, the head 102 of the bottom face 108 is substantially hemispherical and the stem 104 of the bottom face 108 is substantially semi cylindrical. However, the shape of the cutting insert body 100 is not limited to these shapes. In one embodiment, the bottom face 108 is concave and the top face 106 is generally flat or less concave than the bottom face 108. The top face 106 may include chip control features as desired for particular metalworking operations. Such chip control features are standard in many cutting inserts and are well known to those of ordinary skill in the field of metalworking.

Typically, cutting inserts used for metalworking operations are made of any hard metal including cemented carbide, ceramic, or steel. These cutting inserts are commonly fabricated using a pressing operation with subsequent sintering. Usually, there is at least some post-sintering grinding necessary to bring the inserts within specifications. Using a pressing and grinding operation, the hemispherical surface of the bottom face and the semi cylindrical surface of the stem 104 may be pressed, but the subsequent grinding operations for these round surfaces is very difficult and time consuming. With the advent of rapid prototyping of solid parts, such cutting inserts, even those with an undercut or a round surface, may now be fabricated with great accuracy.

The cutting insert body 100 includes a cutting edge 110 at the head 102 of the cutting insert body 100. The cutting edge 110 is preferably formed along the perimeter of the top face 106 of the head 102, and in the illustrated embodiment, the cutting edge 110 is formed at the end of the cutting insert body 100 with respect to the length of the body 100. A relief surface 112 may be formed behind the cutting edge 110.

The cutting insert body 100 further includes a locking recess 114 on the stem 104 of the cutting insert body 100. As illustrated, the locking recess 114 is formed at the top face 106 of the stem 104. However, in an alternative embodiment, the locking recess 114 may be formed at the bottom face 106 of the stem 104.

The locking recess 114 includes a locking surface 116 disposed on the top face 106 along the stem, and the locking surface 116 faces the head 102 of the cutting insert body 100. In the non-limiting illustrated embodiment, the locking recess 114 is formed in the shape of a channel oriented across the width w of the stem 104. Also, a plurality of locking recesses may be formed at the stem 104 such that a plurality of locking surfaces are formed on the cutting insert body 100.

In the illustrated embodiment, the locking surface 116 is formed to be substantially normal to the length direction of the cutting insert body 100. However, to insure the cutting insert body 110 is positively captured by the cutting insert holder, it is preferable that a capture angle α formed between the locking surface and a lengthwise centerline C of the cutting insert body 100 is less than 90 degrees and preferably between 60-90 degrees.

Although shown as a straight line across the width w of the stem 104, the locking recess 114 may be formed in any shape such that a locking surface 116 forms a capture angle α, as discussed.

The cutting insert body 100 may further include a bevel 118 between the locking surface 116 and the end of the stem 104 of the cutting insert body 100. In the non-limiting illustrated embodiment, the bevel 118 is formed as a sloped angle with respect to the lengthwise centerline of the cutting insert body 100. However, the bevel may include, for example, a straight surface, a curved surface or may include a number of segments of sloped surfaces.

FIGS. 11, 14, and 16-18 illustrate a cutting insert holder according an embodiment of the present invention with an empty cavity, and FIGS. 9-13, 15, and 19 illustrate the cutting insert holder with cutting inserts mounted within a plurality of cavities.

Figure 12:
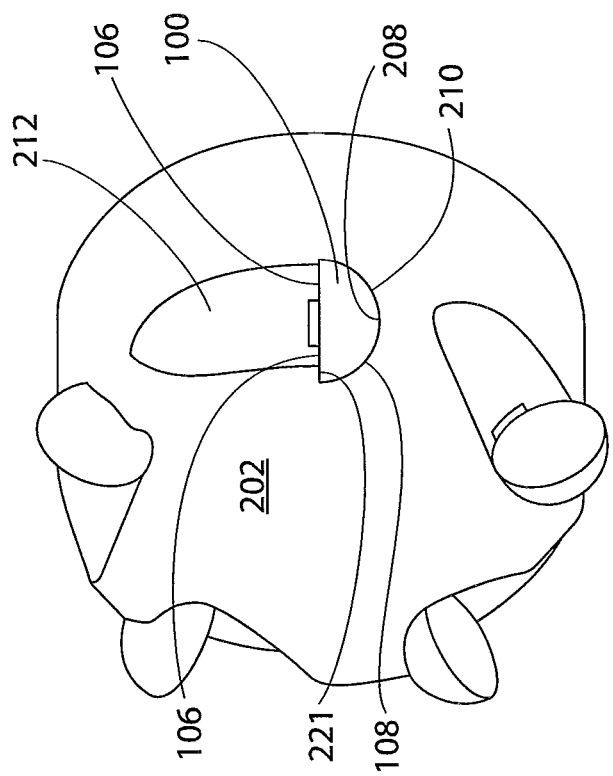
FIG. 12 illustrates the cutting insert holder with cutting inserts therein.
Figure 11:
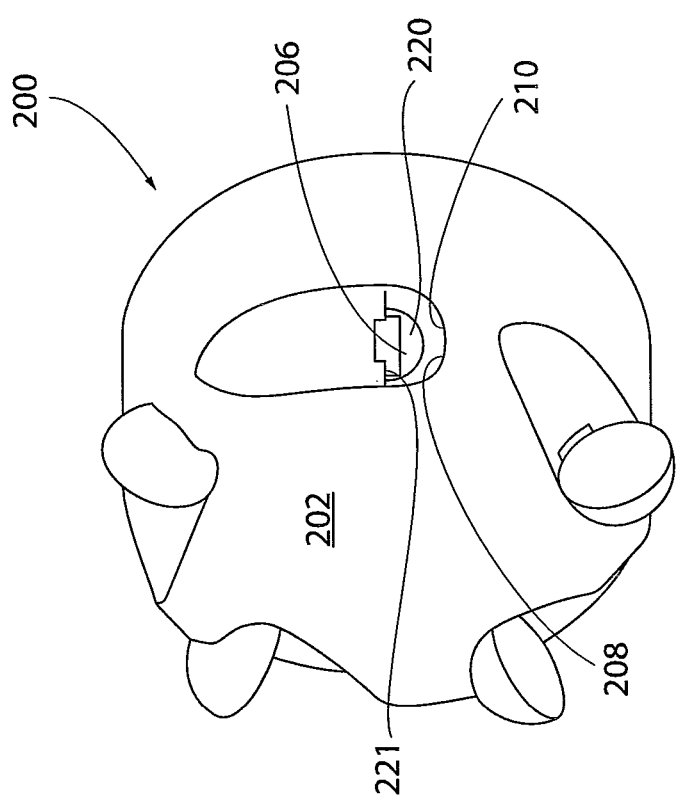
FIG. 11 is a perspective view of the cutting insert holder along lines "11-11" in FIG. 16.

FIG. 11 shows the holder body 200 looking directly into an empty cavity 220, while FIG. 12 illustrates the identical holder body 200 but with a cutting insert body 100 mounted therein. As illustrated in FIGS. 11 and 12, the cutting insert holder body 200 is adapted to receive at least one cutting insert body 100. The holder body 200 may include a first end 202 and a cylindrical side surface 204. In a preferred embodiment, the cutting insert holder body 200 is cylindrical and is rotatable about an axis of rotation 213 as best shown with respect to FIG. 10.

As illustrated in FIG. 11, the holder body 200 includes an opening 206 to cavity 220 formed into the body 200 for receiving the cutting insert body 100 therein, as shown in FIG. 12. The holder body 200 includes a retention pocket 212 associated with each cutting insert and formed at the first end 202 within the side surface 204. As shown in FIGS. 11 and 12, there are a plurality of retention pockets 214 evenly distributed about the axis of rotation 214. Each cavity 220 has an opening 206 formed with the holder body 200 at each of the retention pockets 214. As illustrated in FIGS. 11 and 12, since the support region in the cavity 220 for the bottom face 108 of the cutting insert 100 is circular, to prevent rotation of the insert 100 within the cavity 220, the upper surface 221 of the cavity 220 abuts against the top face 106 of the stem 104 of the cutting insert 100.

As illustrated in FIG. 12, the holder body 200 includes a head support 208, including head support surface 210, disposed at an end of each retention pocket 214 and adjacent to each respective opening 206 to provide support to the cutting insert body 100 when the holder body 200 is rotating and the cutting insert body 100 is engaged with a workpiece. Thus, the head support 208 is positioned to support a bottom face 108 of a head 102 of a cutting insert body 100 inserted into the respective opening 206. The head support surface 210 is shaped to correspond to the shape of the bottom face 108 of the head 102 of the cutting insert body 100. In the illustrated embodiment, the head support surface 210 and the bottom face 108 of the head 102 of the cutting insert body 100 are substantially hemispherical in shape.

Figure 15:
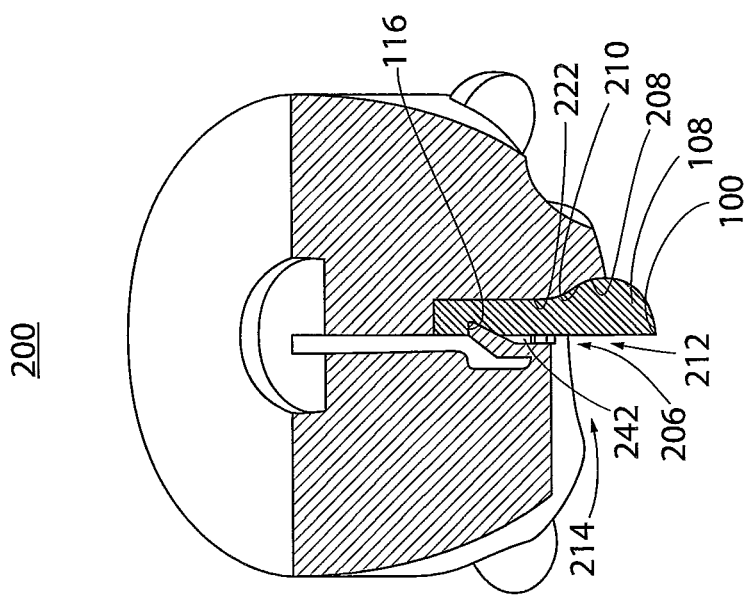
FIG. 15 illustrates a sectional view of the cutting insert holder shown in FIG. 14 but with a cutting insert mounted therein.
Figure 14:
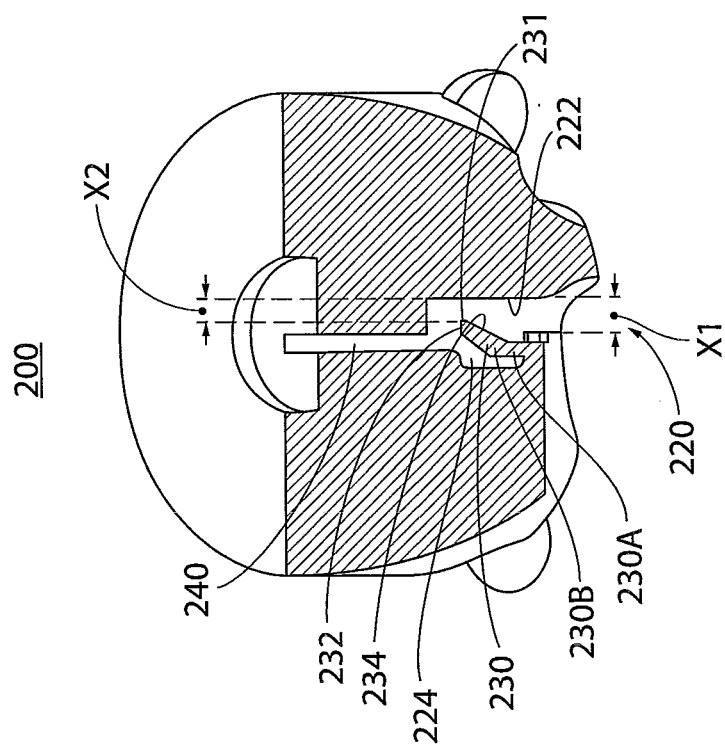
FIG. 14 illustrates a sectional view of the cutting insert holder along line "14-14" in FIG. 10.

FIGS. 14 and 15 illustrate sectional views of the holder body 200 as previously described. These views provide a cross-sectional view of a cut directly across the cavity 220, as opposed to directly into the cavity. As illustrated, the holder body 200 includes cavity 220 configured to receive a cutting insert body 100, and a resilient locking tab 230 configured to lockingly engage with the inserted cutting insert body 100. The purpose of the locking tab 230 is to positively capture the cutting insert body 111 within the cavity 220 by engaging with the locking surface 116 (FIG. 5) of the cutting insert body 100.

As illustrated in FIG. 14, the locking tab 230 is disposed within the cavity 220 and partially obstructs the cavity 220 such that the width X2 between the tip 231 of the resilient locking tab 230 and an opposing wall of the cavity 220 is less than the width X1 of a minimum opening measurement of the cavity 220. Thus, the locking tab 230 obstructs the insertion of the cutting insert body 100 into the cavity 200.

Figure 13:
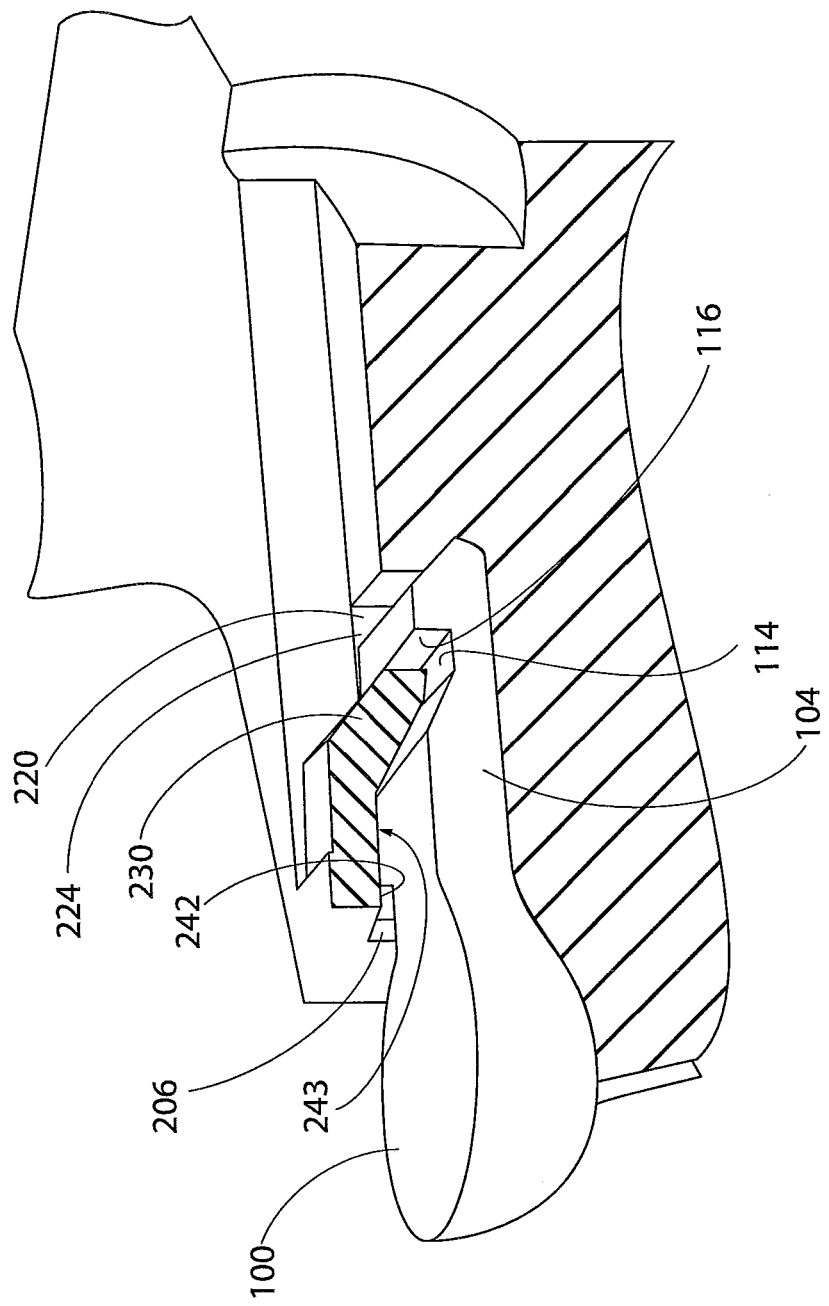
FIG. 13 illustrates a perspective sectional view of the cutting insert holder with a cutting insert therein.

FIG. 13 illustrates a perspective view of a partial sectional view of the cutting insert holder together with the inserted cutting insert. As illustrated in FIG. 13, it can be appreciated that after the cutting insert 100 is sufficiently inserted into to the cutting insert holder 200 via the opening 206 to the cavity 220, locking tab 230 elastically displaces from the obstructing position to allow insertion of the cutting insert body 100 into the cavity 220 and then, after the cutting insert body 100 is inserted to a sufficient distance into the cavity 220, the locking tab 230 snaps into the recess 114.

Accordingly, the locking tab 230 is formed of a material, such as machine steel, such that the locking tab 230 elastically displaces from the obstructing position to allow insertion of the cutting insert body 100 into the cavity 220. However, it is also possible for the tab 230 and the remainder of the holder body to be made of different materials. Fabrication of such a design is made much easier utilizing 3D printing process. As illustrated in FIG. 14, the cavity 220 includes a cavity relief area 224 of the cavity 220. As such, upon insertion of the cutting insert body 100, the resilient locking tab 230 moves from the obstructing position into the cavity relief area 224.

To aid in the insertion of the cutting insert body 110 into the cavity 220, the cutting insert body 100 may include a bevel 118 (FIG. 1) previously described above and/or the locking tab 230 may include a bevel 234 (FIG. 14). The bevel 234 may be sloped for guiding the locking tab 230 away from the cutting insert body 100 during the insertion of the cutting insert body 100 into the cavity 220. The purpose of the bevel 118 is to assist in displacing the locking tab 230 when the cutting insert body 100 is initially inserted within the cavity 220.

After the cutting insert body 100 is inserted to a sufficient distance into the cavity 220 such that the locking surface 116 of the recess 114 passes the displaced resilient locking tab 230, the locking tab 230 snaps into the recess 114. As a result, the cutting insert body 100 is positively retained within the cavity 220 because the locking tab 230 within the recess 114 acts against the locking surface 116, thereby preventing removal of the cutting insert body 100. As can be understood with reference to FIGS. 13 and 15, once the resilient locking tab 230 engages into the locking recess 114, it would become difficult or impossible to simply pull the cutting insert body 100 from the holder body 200 due to the engagement of cutting insert body locking surface 116 with holder locking surface 232.

In the non-limiting embodiment illustrated in FIG. 14, the locking tab 230 has a first portion 230A that extends from a wall of the cavity 220 and a second portion 230B that is at an angle, with respect to the second portion, such that the second portion has an end that partially obstructs the cavity. However, the locking tab may take any shape such that the resilient locking tab 230 initially obstructs the insertion of the cutting insert body 100 into the cavity 200, and then is displaced from the obstructing position to allow insertion of the cutting insert body 100 into the cavity 220. Upon further insertion, the locking tab 230 snaps into the recess 114 of the cutting insert body 100 to secure the cutting insert 100 within the cavity 220.

The locking tab 230 may be formed without the angle between the first and second portions of the locking tab described above.

In another example, the locking tab may take the form of a hook which includes a first portion that extends downwardly towards the first end 202 of the holder body 200 and a second portion with a hook shape such that the locking surface 116 of the cutting insert body 100 is engaged by the hook. As opposed to the earlier arrangement in which the locking tab 230 is compressed if the cutting insert body 100 is pulled in a direction from the cavity 220, in this embodiment, the hook arrangement would be placed in tension if the cutting insert body 100 is pulled in a direction from the cavity 220.

As illustrated in FIGS. 14 and 15, the holder body 200 includes stem support surface 222 for supporting the stem 104 of the cutting insert body 110 with the cavity 220. In the non-limiting illustrated embodiment, the stem support surface 222 supports a bottom face 108 of the stem 104 and the locking tab 230 engages with a locking recess 114 at a top face 106 of the stem 104. In alternative embodiments, the positions of the support surface 222 and locking tab 230 may be reversed with respect to the top face 106 and bottom face 108 of the stem 104. Also, the holder body 200 may include stem support surfaces at both faces of the stem 104.

In the non-limiting illustrated embodiment of FIG. 16, the cavity 220 extends from the first end 202 inwardly to the body 200. For example, an axis 203 along the cavity 220 may form an angle x of approximately 45 degrees with respect to the axis of rotation 213. However, the insert direction may be modified depending on a configuration of the holder body 200 and the configuration of the cutting insert body 100.

Additionally, as illustrated in FIGS. 16-19, the holder body 200 may include a cooling channel 240. In one aspect, the cooling channel 240 may be fluidly connected with a cooling fluid supply to the cavity 220 to provide cooling of the holder body 200 and to provide a coolant spray to the workpiece in the region of cutting. The coolant may be liquid or a gas, such as air, liquid nitrogen, or another gas used as coolant for metalworking operations.

As illustrated in FIG. 15, the holder body 200 may be configured to include a gap 242 between a surface of an opening 206 to the cavity 220 and a surface of the inserted cutting insert body 100. In one aspect, a cooling fluid may be contained in the cavity 200, and the cooling fluid may flow through the gap 242. In a preferred embodiment, as illustrated in FIGS. 16-19, the holder body 200 includes the cooling channel 240 and the gap 242 (FIG. 15) such that a cooling fluid flows through the cooling channel 240 through the gap 242. As illustrated in FIG. 19, there must be adequate clearance around the cutting insert body 100 to permit coolant to travel past the cutting insert body 100.

The arrangement described herein may be used for disposable cutting insert holders, such that when a cutting insert becomes worn or damaged beyond its useful life, the entire cutting insert holder is disposed. However, it is also possible to remove damaged or worn inserts for replacement.

As illustrated in FIGS. 13 and 15, the gap 242 may be between the top face 106 of the cutting insert body 100 and an opposing face 243 in the cavity 220. As a result, a tool may be inserted within the gap 242 to resiliently displace the locking tab 230 from the recess 144 so that the cutting insert body 100 may be removed from the cavity 220. Thus, a damaged cutting insert body 100 may be removed from the holder body 200 and may be replaced with another cutting insert body 100.

Figure 20:
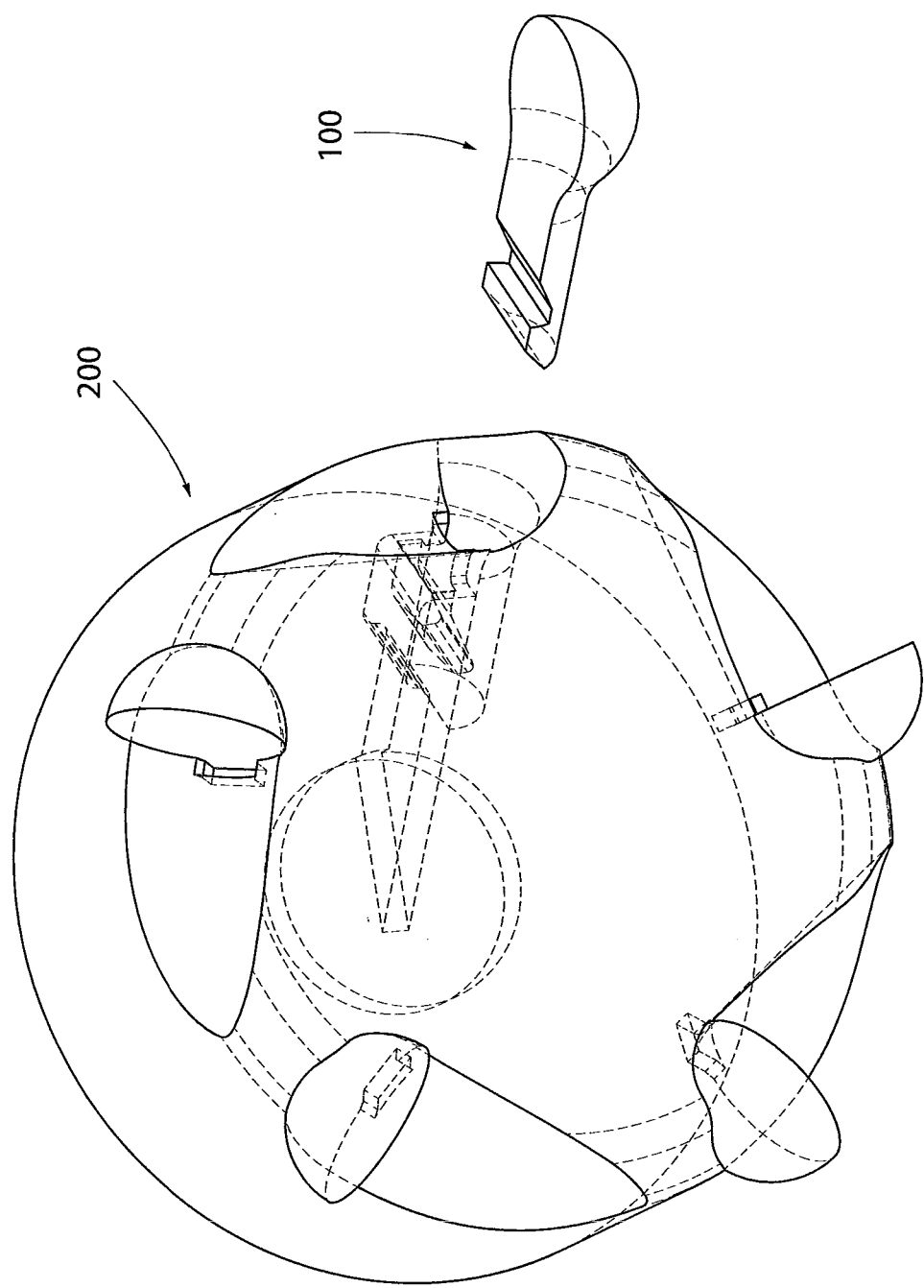
FIG. 20 illustrates a three-dimensional see-through view of the cutting insert holder together with a detached cutting insert as shown in FIG. 1 and identical cutting inserts mounted therein.
Figure 21:
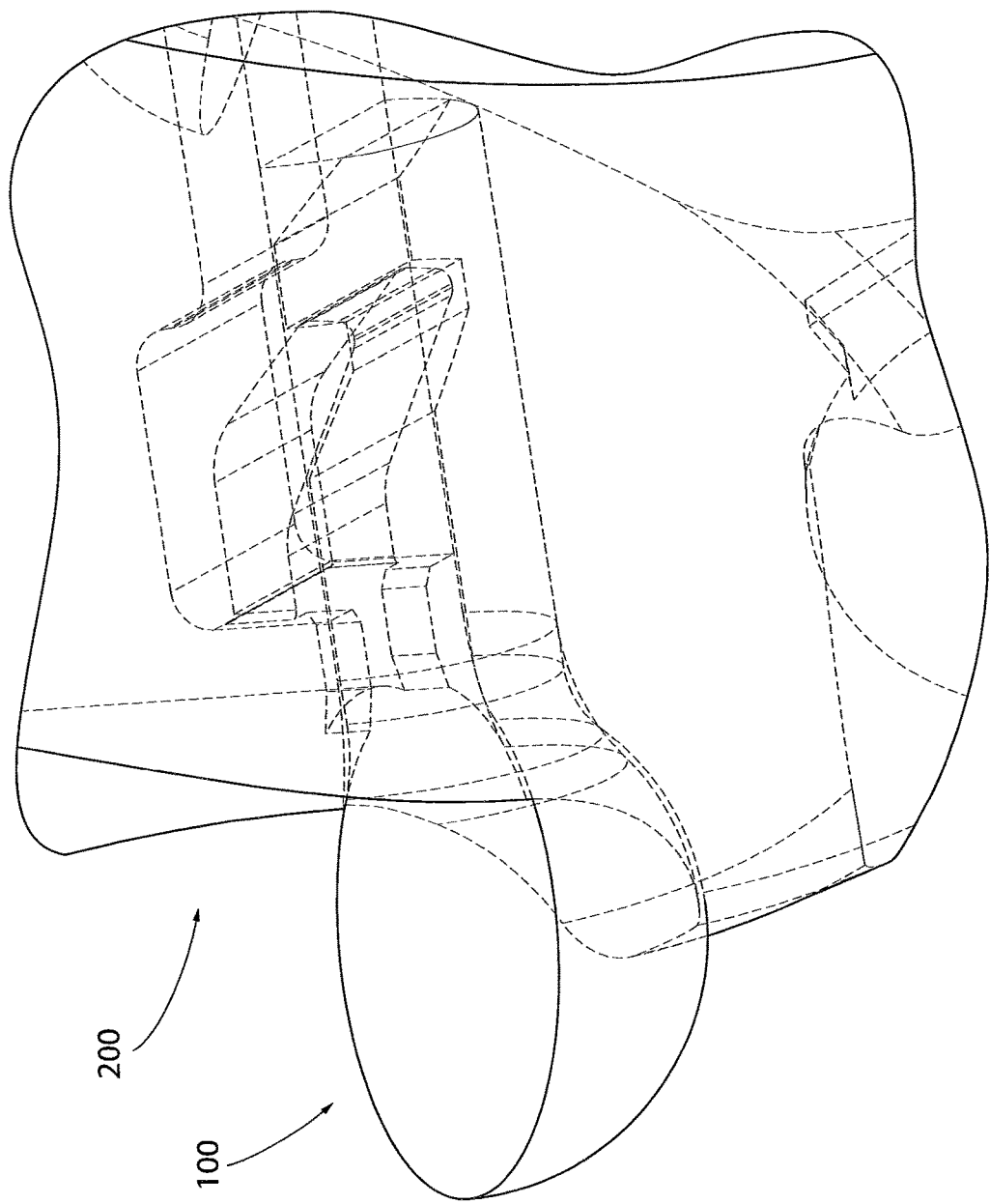
FIG. 21 illustrates a zoomed-in three-dimensional see-through view of the cutting insert holder together with a cutting insert secured therein.

FIG. 20 illustrates a three-dimensional see-through view of the cutting insert holder together with a separate cutting insert. FIGS. 21 and 22 illustrate zoomed-in three-dimensional see-through views of the cutting insert holder with a cutting insert secured therein. These three-dimensional views more clearly illustrate the relationship between the cutting insert and the cutting insert holder from a three-dimensional perspective.

In another embodiment of the present invention, a method of manufacturing a cutting insert comprises forming, through a sequential layering process, a body having a head at an end of the body and a stem at an opposite end of the body. The body has a cutting edge at the head and a locking surface at the stem. The locking surface is made up of a locking recess extending into the stem.

This process of sequential layering may be performed through a process commercially referred to as rapid prototyping, which may comprise 3D printing, electron beam melting, laser melt, selective laser sintering, and laser job welding as well as fused deposition method. Using rapid prototyping, layers of material, such as cemented carbide, are deposited in a predefined pattern to produce a 3D prototype. This method is capable of fabricating shapes that in the past have been impossible using conventional techniques such as powder pressing. In particular, fabricating intricate cavities or undercut portions is very difficult with powder pressing but made relatively easy through 3D printing.

In another embodiment of the present invention, there is a method of manufacturing a cutting insert holder body adapted to receive at least one cutting insert. The method includes forming, through a sequential layering process, a cutting insert holder body having a cavity formed into the body for receiving a cutting insert therein. The body further includes a resilient locking tab disposed within the cavity and partially obstructing the cavity such that the cutting insert, when introduced to the cavity, displaces the resilient locking tab from an initial position to allow insertion of the cutting insert into the cavity and returns toward the original position to lockingly engage with a locking surface of the cutting insert.

This process of sequential layering may again be performed using the rapid prototyping techniques just described, and preferably using 3D printing techniques.

While this invention has been described with respect to a rotating tool, it should be appreciated that this design may be used for any number of other tools, wherein a removable cutting insert is secured to a toolholder, such as a cutting insert in a square shank toolholder.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A cutting insert, comprising:
    a body having a head disposed at an end of the body and a stem disposed at an opposite end of the body, wherein the stem extends along a longitudinal axis;
    a cutting edge at the head of the body; and
    a locking recess on the stem of the body,
    wherein a bottom face of the head has a hemispherical shape, and
    wherein top faces of the head and stem are substantially planar.

2. The cutting insert of claim 1, wherein the body has a length, width and depth, the length being greater than the width.

3. The cutting insert of claim 1, wherein the width of the head is greater than the width of the stem.

4. The cutting insert of claim 1, wherein the cutting edge is formed along the perimeter at the top face of the head and a relief surface is formed behind the cutting edge.

5. The cutting insert of claim 1, wherein the locking recess is disposed on the top face of the stem and includes a locking surface facing the head of the body.

6. The cutting insert of claim 5, wherein the locking surface is substantially normal to the longitudinal axis.

7. The cutting insert of claim 5, wherein the locking surface forms an angle α with the longitudinal axis of between 60-90 degrees.

8. The cutting insert of claim 1, wherein a bottom face of the stem has a semi cylindrical shape.

9. The cutting insert of claim 1, further comprising a bevel between the locking recess and the opposite end of the body.

* * * * *